E. G. BAILEY.
PRESSURE RELATION GAGE.
APPLICATION FILED MAR. 20, 1913.

1,153,414.

Patented Sept. 14, 1915.

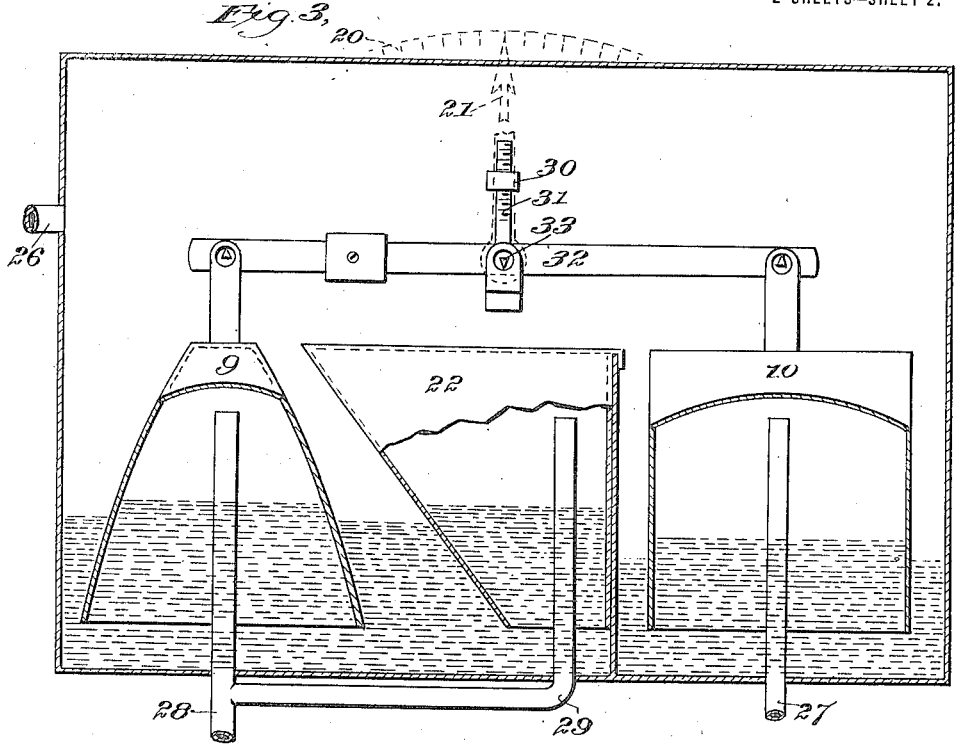
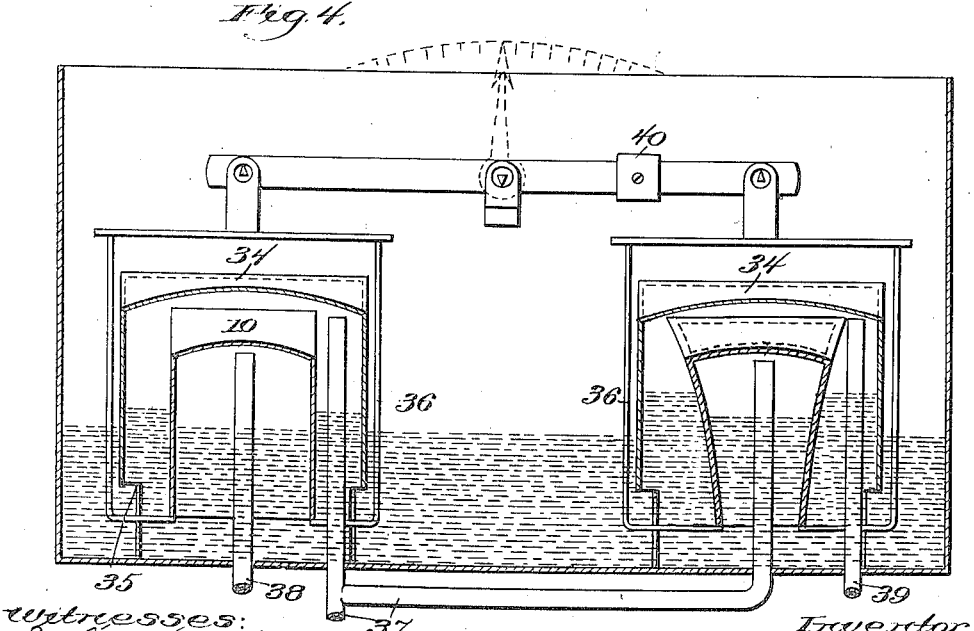

UNITED STATES PATENT OFFICE.

ERVIN G. BAILEY, OF NEWTON HIGHLANDS, MASSACHUSETTS.

PRESSURE-RELATION GAGE.

1,153,414.  Specification of Letters Patent.  Patented Sept. 14, 1915.

Application filed March 20, 1913. Serial No. 755,594.

*To all whom it may concern:*

Be it known that I, ERVIN G. BAILEY, a citizen of the United States, residing in Newton Highlands, in the county of Middlesex and State of Massachusetts, have invented an Improvement in Pressure-Relation Gages, of which the following description in connection with the accompanying drawings, is a specification, like letters on the drawings representing like parts.

The present invention relates to a pressure relation gage, and is embodied in an instrument provided with means for operating an indicating or recording device which expresses the relation existing between three or more pressures which operate on the instrument. The general expression of the resultant of this relation is $$R = \frac{(p^1 - p^2)}{f(p^4 - p^3)}$$

in which R represents resultant, and $p^1$, $p^2$, $p^3$ and $p^4$ represent the four different pressures, while the symbol $f$ represents function, indicating a more complex relation than merely the simple ratio of two differences of pressures. In some cases this function may be such as to leave the resultant equal to the simple ratio between the two differences; and, in some cases, $p^4$ may be equal to $p^1$, while, in other cases, $p^4$ may be equal to $p^2$, thus leaving only three pressures necessary to operate the instrument, and indicate the desired relation.

While it is necessary to modify, readjust or rearrange some of the working parts of the instrument embodying this invention, in order to adapt it for use under different conditions, the principle of the operation is the same in all cases and depends upon utilizing, as one operating element of the instrument, a movable part acted on by a force which varies as some function of a difference between two of the pressure factors; and utilizing as another part of the instrument a movable part acted on by a force which varies directly as a difference between two of the pressures; and mechanically arranging said elements so that the respective forces acting on them are opposed to each other.

Figure 1:
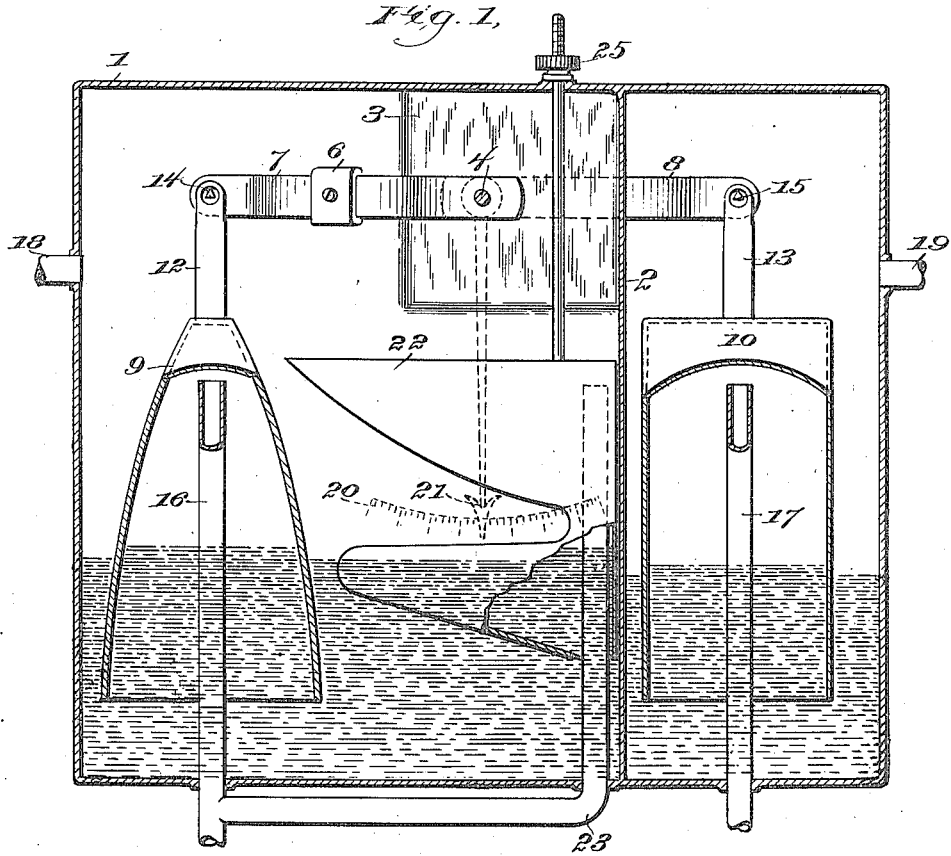
Figure 2:
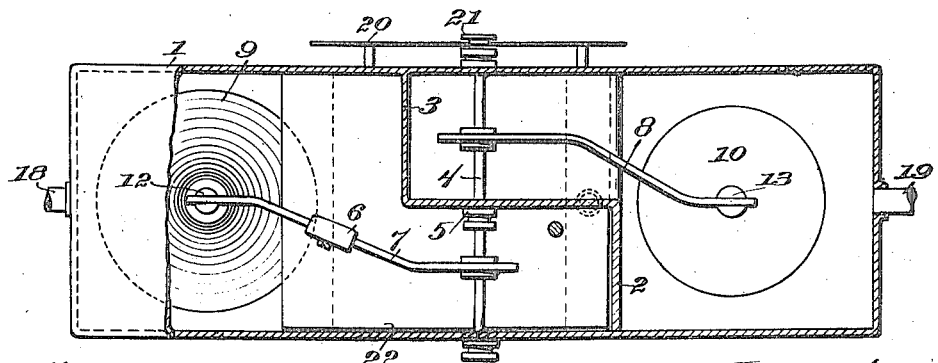

Figure 1 is a vertical section, partly in elevation, of an instrument embodying the invention; Fig. 2 is a plan view of the same, partly in section; Fig. 3 is a vertical section, partly in elevation, of an instrument of modified construction; and Fig. 4 is a similar view of another modified form of instrument.

The operation of the instrument can be readily understood by describing it as arranged to be used for indicating the relation between the rate of flow of fuel oil to a boiler furnace, and the amount of steam generated in the boiler, in which case there are four pressures which constitute the factors entering into the equation, the instrument shown in Fig. 1 being adapted, for this purpose; or, by describing it as arranged to be used for indicating the resistance of the fuel bed in a furnace, as compared with some substantially constant resistance through which the furnace gases are flowing. In the latter case, only three pressures are involved as factors, and the instruments shown in Figs. 3 and 4 are arranged and adapted for this use. It is to be understood, however, that by slight modifications and adjustments of the working parts the instrument can be applied to a variety of useful purposes.

Referring to Fig. 1, the instrument therein shown consists of a closed case 1 having a partition 2 which divides it into two chambers, the said partition having an off-set 3 through which extends a shaft 4, so that levers 7 and 8 can be fastened to said shaft and at the same time can be located, respectively, in the different chambers. To prevent leakage, the shaft bearings are suitably packed where the shaft passes through the walls of the chamber. The said shaft 4 is free to oscillate in its bearings 5, and all the parts are balanced by means of an adjustable weight 6 mounted on one of the levers and capable of being moved along the same and fastened when equilibrium of moments is attained. The instrument is also provided with bells 9 and 10, which are suspended by links 12 and 13 from pivots 14 and 15 on the levers 7 and 8, respectively. Each of the chambers is partially filled with some liquid which seals the bottom of the bell which is suspended in it, and pipes 16 and 17, which project upwardly through the liquid into the space within the bells, are utilized to convey pressures which produce forces tending to cause upward movements of the bells, respectively. The pressures which constitute the other factors of the equation are conveyed, respectively, into the chambers which contain the bells 9 and 10, entering the chamber above the surface of the liquid, so that the pressures conveyed through pipes 18 and 19, provided for the purpose, will act upon the respective bells in opposition to the forces which tend to cause the upward movements thereof; also acting on the liquid surrounding the bells, in opposition to the forces acting on the liquid inclosed in the bells. If, for example, the pipes 19 and 17 are connected to the dynamic and static parts of a Pitot tube, or similar device in device, so that the difference between the pressures in the pipes varies as some known function of the rate of flow of steam from a boiler, a definite resultant force due to the difference between these pressures will exist for any given rate of flow of steam and will act on the bell 10. Similarly, by connecting the pipes 18 and 16 to the dynamic and static parts of a Pitot tube, or similar device in the pipe supplying oil to the boiler furnace, a definite force, due to the pressure difference which exists for any given rate of flow of oil, will act on the bell 9.

For any given rate of flow of oil burned with proper efficiency, a definite amount of steam should be generated, but the ratio of the rate of flow of oil to the rate of flow of steam will vary with the latter, being a minimum when the boiler is working at its most efficient rate, and increasing, either directly or inversely as the characteristic efficiency curve of the boiler. The instrument is provided with a scale 20 and an indicator 21 connected with the shaft 4, and the various parts are so arranged and adjusted that all the mechanical elements will be in equilibrium when the indicating member stands at a certain mark on the scale, which shows that the desired relation exists between the rates of flow of oil and steam throughout their working range of variation. Furthermore, the arrangement is such that the indicating member will move in one direction in case there is an excess supply of oil, and in the opposite direction if there is a deficiency, the movement being due to the forces acting on the bells. When the ratio of the pressure differences varies with the rates of flow, it is necessary, in order to maintain the indicating member in the stated position when the correct relation exists, to vary the intensity of force per unit pressure difference acting upon one or the other of the bells. This variation is brought about, in accordance with the invention, by varying the horizontal sectional area of either or both bells. In the construction shown, the horizontal sectional area of the bell 9 varies in a suitable manner, while the horizontal sectional area of the bell 10 is uniform. The surface of the liquid in the bell 9 will stand at a height above the surface of the liquid outside the bell, which height is directly proportional to the preponderance of the pressure conveyed to the chamber over that conveyed to the inside of the bell; and the force exerted upon the bell is equivalent to the weight of that volume of the liquid which is above the surface of the liquid outside (the volume displaced by the pipe 16 not being excluded). By suitably varying the area of the bell 9 and the height of the surface of the liquid in the chamber containing said bell, the volume of liquid within the bell, above the level of the liquid surrounding said bell, is caused to vary in any desired relation to its height, and thereby any desired force per unit difference of pressure may be obtained.

The shape of the bell cannot be varied after the instrument is constructed, but the height of the surface of the liquid in the chamber may be varied in accordance with any desired function of the difference in pressures conveyed through the pipes 18 and 16. As shown in Figs. 1 and 2, this may be accomplished by varying, from top to bottom, the confining limit of the liquid in the chamber, as by providing the chamber with a suitably shaped displacing member, the shape of which is such as to vary the area of the liquid exposed at the surface as the level of said surface changes. When a separate displacing member is used, it may be made capable of vertical adjustment. Furthermore, the said displacing member may be in the form of a chamber, closed, except at the bottom, and sealed in the liquid; in which case the interior of the displacing member may be subjected to the same pressure as that within the bell 9, whereby the displacing member is also utilized as a supplement to said bell in the change of area of the liquid which is confined in the bell and displacing member, compared to the area of the liquid outside. As shown in Figs. 1 and 2, the said displacing member consists of a vertically adjustable chamber 22, which is closed on all sides and at the top, but open at the bottom and sealed by the liquid. The said displacing member receives, through a branch pipe 23, the same pressure as that conveyed to the interior of the bell 9, so that the liquid rises in the displacing member 22 to the same height as it does in bell 9. The volume of liquid, which is held up in the bell 9 and displacing member 22, causes a lowering of the level of the liquid in the compartment outside of the said bell and member, which change of level varies inversely as the remaining area of the free surface of the liquid outside, so that, by properly shaping the area of the member 22 with respect to its own height, and with respect to the shape of the bell 9, the density of the liquid, and the surface area of the liquid, the level of the surface outside of the bell and displacing member is varied as a definite function of the difference between the outside and the inside pressures, thereby causing the force per unit of pressure difference to balance the force due to the difference between the pressures acting on the bell 10, when the desired relation exists between the rate of flow of steam and the rate of flow of oil for any desired rate of flow of steam.

Taking the arrangement of the parts as shown in Fig. 1, the operation of the instrument may be described as follows: Starting with zero differences of pressures in the two compartments and the mechanism in equilibrium, the pointer 21 is so positioned with relation to the mechanism and to the scale 20 as to indicate the correct relation between the rates of flow (which is true when both are zero). With the first increments of pressure differences, the ratio of the resulting force acting on the bell 9 to the force acting on the bell 10 will be inversely proportional to the areas of the two. A further increase in the pressure difference acting on the bell 9 and displacing member 22 will cause the liquid to rise in the said bell and member above the normal level of the liquid in the compartment, and the level of the liquid outside of the said bell and member will be lowered at a rate which is inversely proportional to the ratio of the combined area of the surface inside of the bell and member to the area of the surface outside of the bell and member, as is shown in Fig. 1. With the relative areas as shown, the level of the liquid outside of the bell and member will be lowered much faster than the level of the liquid inside thereof will be raised, and the mean area of the surface of the liquid sustained in the bell 9 by the pressure difference will be increased, thus requiring a relatively less increase in the pressure difference acting on the bell 9 with relation to the increase in pressure difference acting on the bell 10, to equalize the respective forces and cause the indicating member to remain stationary. This condition will continue until the rate of flow of steam and the rate of flow of oil which correspond to maximum efficiency has been reached. Beyond that point, the pressure difference acting on the bell 9 will become such that the rise of the surface of the liquid in the bell 9 and displacing member 22 will be greater than the fall of the surface of the liquid outside thereof; and the mean area of the volume of liquid sustained in the bell 9 will diminish, thus requiring an increase in the ratio of the pressure difference acting on said bell 9 to that acting on the bell 10. It is evident, therefore, that the equation $$R = \frac{p^1 - p^2}{f(p^4 - p^3)}$$

has been satisfied when the function represented by $f$ is dependent upon the boiler efficiency curve as affected by the rate of driving. In case the force due to the pressure difference acting on the bell 9 is greater than is necessary to balance the force due to the pressure difference acting on the bell 10, and thereby to maintain the necessary equilibrium of forces to keep the indicating member 21 in the desired position, the bell 9 will move downward and the mean area of the surface of the liquid sustained in said bell will be decreased to correspond, thereby reducing the force caused by the pressure difference until it again equals the balancing force acting on the other bell, so that equilibrium is restored. Therefore, no further movement will take place, and the position of the indicating member will show that the rate of flow of oil is greater than it should be with relation to the rate of flow of steam, and approximately to what extent. This indicates that the desired efficiency is not being maintained because of faulty conditions which should be corrected.

The general shape of the bell 9, as well as that of the displacing member 22, is determined from empirical data relative to boiler efficiency at different rates. After these shapes have been determined and the instrument constructed accordingly, it is only necessary to adjust the level of the liquid and the vertical position of the displacing member 22, as by a nut 25, in order to take care of the minor differences between individual boilers and furnaces. The normal equilibrium of the mechanical parts of the device may be further modified by properly adjusting the counterweight 6.

In Fig. 3, I have shown a modified form of instrument in which there are only three pressure factors involved, and the resultant desired is expressed by the equation $$R = \frac{p^1 - p^2}{f(p^1 - p^3)}$$

and in the actual form of instrument shown, the $f$ function is unity and the relation between the pressure differences is proportional to the simple ratio of the pressure differences. In this instrument, the arrangement of the bells and the case is substantially the same as previously described, except that the closed case is not divided above the bells, although the liquid which seals the bells is in different compartments.

The pressure $p^1$ is admitted to the casing through the pipe 26, and acts on the outside of both bells, as well as on the surface of the liquid surrounding them. Pressures $p^2$ and $p^3$ are conveyed through pipes 27 and 28 to the interiors of the bells 10 and 9, respectively; and when equilibrium of the parts is upset by a departure from the desired ratio, it is restored after a certain movement of the parts has taken place, by the effect caused through change of areas due to the shape of the bell 9. The pressure $p^3$ is also conveyed to the displacing member 22 through the branch pipe 29. In this instrument, the area of the bell 9 varies directly as its height, and the inside and outside areas of the displacing member 22 also vary directly as its height, increasing as the area of the bell 9 decreases. The bell and displacing member are also of such size relative to the size of the chamber that the area of the liquid surrounding the bell 9 and displacing member 22 equals the combined areas of the liquid within said bell and displacing member when the bell 9 is in its normal position.

The ratio between the two pressure differences $p^1-p^2$ and $p^1-p^3$, when the indicating member 21 is in its normal position is determined by the ratio of the surface area of the liquid within bell 9 when in its normal position, to the surface area of the liquid within bell 10, which in turn is dependent upon the depth of liquid in the compartment containing the bell 9, and is adjustable by adding or taking out liquid until the instrument is set for the desired ratio between the pressure differences. Any increase in pressure difference $p^1-p^3$ will cause the surface of the liquid to rise in the bell 9 and the displacing member 22, and also to fall a like amount in the space outside, on account of the ratio of areas as previously stated, so that the mean height of the liquid in bell 9 above the surface of the surrounding liquid remains unchanged, and the total volume of liquid supported in the bell 9 varies directly with the pressure difference $p^1-p^3$, and equilibrium of forces due to pressure differences is maintained so long as pressure difference $p^1-p^2$ bears a constant ratio to pressure difference $p^1-p^3$ throughout the entire working range of pressure differences. Any deviation from this ratio will produce motion of the oscillating parts and by increasing or decreasing the effective area of bell 9, equilibrium of moments will be automatically restored and the position of the indicating member 21 with respect to the scale 20 will show the amount of deviation from the normal ratio between the pressure differences.

In order that the change in position of the indicating member may represent the change in ratio, it is necessary to counteract the change in buoyant action upon the bells as one sinks more deeply into the liquid and the other is raised from the liquid. This is accomplished by means of a counterweight 30 supported upon the rod 31, as shown, which is equivalent to having the center of gravity of the beam 32 and its rigid attachments, above the pivot 33, so that a moment is introduced by its oscillation through a limited angle that is sufficient to counteract the moment due to the change in buoyancy of the bells.

In the modification shown in Fig. 4, the inclosing case is dispensed with by providing the receptacle for the sealing liquid with hoods 34 for the bells, the said hoods being closed at the top, but having lateral openings 35 below the surface of the liquid for the lower ends of yokes 36 by which the bells are supported, the yokes being hung from the beam which corresponds to the levers 7 and 8 of Fig. 1. The displacing member is also dispensed with, and the change in effective area of the bell 9 is introduced into the relation, other than a simple ratio, which is desired, and represents the $f$ function in the equation. In this instrument the pressure $p^2$ is conveyed through pipe 37 to the inclosed space outside of the bell 10 and to the inclosed space inside of the bell 9, while the pressure $p^1$ is conveyed through the pipe 38 to the inside of the bell 10, and the pressure $p^3$ through the pipe 39 to the outside of the bell 9, the tendency of both bells being to move upward. As in other forms of instrument shown, any variation from the relation desired will cause movement until equilibrium is restored by change of area.

In order to vary the $f$ function beyond the variation produced by the variable area of the bell 9, the counterweight 40 may be so adjusted that the indicator will stand in some other than normal position for zero pressure differences, and the force due to such counterweight will then have a varying effect upon the position of the indicator, decreasing with increase of the pressure difference $p^2-p^3$ and causing the changing relation of pressure differences necessary to satisfy the conditions with different intensities of pressure difference.

It is perfectly obvious that four different pressures may be applied to the instruments shown in Figs. 3 and 4, or three pressures to the instrument shown in Fig. 1.

The underlying principle is the same throughout, and the minor features of difference shown in the several forms of instruments are capable of application to any of them, and it is obvious that still further modification can be made without departing from the invention.

What I claim is:

1. In a pressure relation gage, the combination with an oscillatable member; of an indicating member adapted to be moved by said oscillatable member; of two movable liquid sealed bells connected to said oscillatable member, and each adapted to receive fluid pressure on opposite sides and producing opposing moments of force about the axis of said oscillatable member, one of said bells having a varying horizontal sectional area; and means whereby the height of the level of the liquid which seals the variable area bell is automatically varied in response to the pressures acting on said variable area bell.

2. In a pressure relation gage, the combination with an oscillatable indicating member; of two movable liquid sealed bells connected to said indicating member; means for subjecting each bell to fluid pressures outside and inside, one of said bells having a variable horizontal sectional area; a chamber containing the liquid in which said variable area bell is sealed; and a displacing member of variable horizontal cross-sectional area, located in said chamber thereby causing the area of the free surface of the liquid in said chamber to be varied with changes in the level of said liquid.

3. In a pressure relation gage, the combination with an oscillatable indicating member; of two movable liquid sealed bells connected to said indicating member; means for subjecting each bell to fluid pressures outside and inside, one of said bells having a variable horizontal sectional area; a chamber containing the liquid in which said variable area bell is sealed; a displacing member located in said chamber, said displacing member comprising a chamber closed at the top and open at the bottom, and sealed in the same liquid as that which seals the variable area bell, said member having a variable horizontal sectional area within and without; and means for subjecting the interior of said displacing member to the action of the same pressure which acts on the interior of the variable area bell.

4. In a pressure relation gage, the combination with an oscillatable indicating member; of two movable liquid sealed bells connected to said indicating member; means for subjecting each bell to fluid pressures outside and inside, one of said bells having a variable horizontal sectional area; a chamber containing the liquid in which said variable area bell is sealed; a displacing member located in said chamber; and means for vertically adjusting said displacing member.

5. In a pressure relation gage, the combination with an oscillatable member; of an indicating member adapted to be moved thereby; two movable liquid sealed bells adapted to receive fluid pressure outside and inside, said bells being connected to said oscillatable member and producing opposing forces due to the pressure differences acting on said bells; and means whereby equilibrium of all said forces, including those produced by the various parts of the mechanism itself, is obtained, and said indicating member caused to remain in a definite position so long as a definite relation exists between said pressure differences.

In testimony whereof, I have signed my name to this specification in the presence of two subscribing witnesses.

ERVIN G. BAILEY.

Witnesses:
JAS. J. MALONEY,
M. E. COVENEY.